(12) United States Patent
Wu et al.

(10) Patent No.: US 10,699,699 B2
(45) Date of Patent: Jun. 30, 2020

(54) CONSTRUCTING SPEECH DECODING NETWORK FOR NUMERIC SPEECH RECOGNITION

(71) Applicant: Tencent Technology (Shenzhen) Company Limited, Shenzhen (CN)

(72) Inventors: Fuzhang Wu, Shenzhen (CN); Binghua Qian, Shenzhen (CN); Wei Li, Shenzhen (CN); Ke Li, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 105 days.

(21) Appl. No.: 15/993,332

(22) Filed: May 30, 2018

(65) Prior Publication Data
US 2018/0277103 A1    Sep. 27, 2018

Related U.S. Application Data

(63) Continuation-in-part of application No. PCT/CN2017/074926, filed on Feb. 7, 2017.

(30) Foreign Application Priority Data

Mar. 29, 2016 (CN) .......................... 2016 1 0188168

(51) Int. Cl.
*G10L 15/06* (2013.01)
*G10L 15/14* (2006.01)
(Continued)

(52) U.S. Cl.
CPC ............ *G10L 15/063* (2013.01); *G10L 15/02* (2013.01); *G10L 15/04* (2013.01); *G10L 15/142* (2013.01);
(Continued)

(58) Field of Classification Search
CPC ... G10L 15/193; G10L 15/083; G10L 15/063; G10L 15/02; G10L 15/04
See application file for complete search history.

(56) References Cited

U.S. PATENT DOCUMENTS

| 7,587,321 B2 * | 9/2009 | Liu ....................... G10L 15/187 704/256.3 |
| 7,725,307 B2 * | 5/2010 | Bennett ................... G06F 17/27 704/9 |

(Continued)

FOREIGN PATENT DOCUMENTS

| CN | 101030369 A | 9/2007 |
| CN | 1674092 B | 6/2010 |

(Continued)

OTHER PUBLICATIONS

Tencent Technology, Written Opinion, PCT/CN2017/074926, dated May 27, 2017, 6 pgs.

(Continued)

*Primary Examiner* — Jakieda R Jackson
(74) *Attorney, Agent, or Firm* — Morgan, Lewis & Bockius LLP (57) ABSTRACT

The embodiments of the present disclosure disclose a method for constructing a speech decoding network in digital speech recognition. The method comprises acquiring training data obtained by digital speech recording, the training data comprising a plurality of speech segments, and each speech segment comprising a plurality of digital speeches; performing acoustic feature extraction on the training data to obtain a feature sequence corresponding to each speech segment; performing progressive training starting from a mono-phoneme acoustic model to obtain an acoustic model; acquiring a language model, and constructing a speech decoding network by the language model and the acoustic model obtained by training.

13 Claims, 8 Drawing Sheets

(51) Int. Cl.
  *G10L 15/02*   (2006.01)
  *G10L 15/04*   (2013.01)
  *G10L 25/24*   (2013.01)
  *G10L 25/90*   (2013.01)
  *G10L 15/187*   (2013.01)

(52) U.S. Cl.
  CPC ............ *G10L 15/144* (2013.01); *G10L 25/24* (2013.01); *G10L 25/90* (2013.01); *G10L 15/187* (2013.01); *G10L 2015/025* (2013.01); *G10L 2015/0631* (2013.01)

(56)            References Cited

U.S. PATENT DOCUMENTS

| | | | |
|---|---|---|---|
| 2004/0230435 | A1 | 11/2004 | Douros |
| 2005/0288929 | A1* | 12/2005 | Kuboyama ............ G10L 15/142 704/251 |
| 2007/0208562 | A1* | 9/2007 | Jeong ...................... G10L 15/02 704/234 |
| 2014/0214416 | A1* | 7/2014 | Yue ........................ G10L 15/083 704/231 |
| 2014/0236591 | A1* | 8/2014 | Yue ........................ G10L 15/193 704/230 |
| 2015/0302851 | A1 | 10/2015 | Talwar et al. |
| 2016/0335341 | A1* | 11/2016 | Krauss .................. G06F 16/367 |
| 2017/0091161 | A1* | 3/2017 | Mehta ................. G06F 17/2288 |

FOREIGN PATENT DOCUMENTS

| | | |
|---|---|---|
| CN | 102339605 A | 2/2012 |
| CN | 103971678 A | 8/2014 |
| CN | 105869624 A | 8/2016 |
| JP | H0229799 A | 1/1990 |
| JP | H 11143490 A | 5/1999 |
| JP | WO2009025356 A1 | 11/2010 |
| JP | WO2012073275 A1 | 5/2014 |

OTHER PUBLICATIONS

Tencent Technology, IPRP, PCT/CN2017/074926, Oct. 2, 2018, 7 pgs.

Tencent Technology, ISR, PCT/2017/074926, May 27, 2017, 2 pgs.

* cited by examiner

CONSTRUCTING SPEECH DECODING NETWORK FOR NUMERIC SPEECH RECOGNITION

PRIORITY CLAIM AND RELATED APPLICATION

This application is a continuation-in-part of PCT Application No. PCT/CN2017/074926, entitled "METHOD AND APPARATUS FOR CONSTRUCTING SPEECH DECODING NETWORK IN DIGITAL SPEECH RECOGNITION, AND STORAGE MEDIUM" filed on Feb. 27, 2017, which claims priority to Chinese Patent Application No. 201610188168.9, filed with the State Intellectual Property Office of the People's Republic of China on Mar. 29, 2016, and entitled "METHOD AND APPARATUS FOR CONSTRUCTING SPEECH DECODING NETWORK IN DIGITAL SPEECH RECOGNITION", all of which are incorporated herein by reference in their entirety.

FIELD OF THE TECHNOLOGY

The present disclosure relates to the technical field of speech recognition, and particularly relates to a method, an apparatus, and a storage medium for constructing a speech decoding network in digital speech recognition.

BACKGROUND OF THE DISCLOSURE

Speech recognition refers to a process during which speech signals are converted into words by a speech decoder. The speech decoder is also called as a speech decoding network usually consisting of an acoustic model and a language model. The acoustic model and the language model respectively correspond to the calculation of speech-to-syllable probability and syllable-to-word probability. The acoustic model and the language model are both obtained by training by using a great number of linguistic data, and further modeling.

Speech recognition for recognizing 0 to 9 digits is also called digital speech recognition. Digital speech recognition can be realized by two types of methods: one type is the adoption of an isolated word recognition technology to recognize digits of speech; the other type is the adoption of a universal continuous speech recognition technology to recognize digits in speech.

In digital speech recognition based on the isolated word recognition technology, it is required that a clear interval exists among digits when digital speech is input.

Therefore, the universal continuous speech recognition technology is used more often for digital speech recognition. The universal continuous speech recognition technology not only recognizes digits, but also recognizes other language content.

SUMMARY

Embodiments of the present invention provide a method, an apparatus, and a storage medium for constructing a speech decoding network in digital speech recognition, so as to improve the recognition accuracy in digital speech.

The technical scheme adopted by the embodiments of the present invention is as follows:

A method for constructing a speech decoding network in digital speech recognition includes acquiring training data obtained by digital speech recording, the training data including a plurality of speech segments, and each speech segment including a plurality of digital speeches; performing acoustic feature extraction on the training data to obtain a feature sequence corresponding to each speech segment; performing progressive training starting from a mono-phoneme acoustic model to obtain an acoustic model according to the feature sequences and the phonemes corresponding to digits in the training data; and acquiring a language model, and constructing a speech decoding network by using the language model and the acoustic model obtained by training.

An apparatus for constructing a speech decoding network in digital speech recognition includes a training data acquisition module, configured to acquire training data obtained by digital speech recording, the training data including a plurality of speech segments, and each speech segment including a plurality of digital speeches; an acoustic feature extraction module, configured to perform acoustic feature extraction on the training data to obtain a feature sequence corresponding to each speech segment; an acoustic model acquisition module, configured to perform progressive training starting from a mono-phoneme acoustic model to obtain an acoustic model according to the feature sequence and the phoneme corresponding to digits in the training data; a language model acquisition module, configured to acquire a language model and construct the speech decoding network by using the language model and the acoustic model obtained by training.

A non-volatile computer-readable storage medium is characterized in that the storage medium stores machine-readable instructions, and the machine-readable instructions are executable by a processor to perform the following operations:

acquiring training data obtained by digital speech recording, the training data including a plurality of speech segments, and each speech segment including a plurality of digital speeches;

performing acoustic feature extraction on the training data to obtain a feature sequence corresponding to each speech segment;

performing progressive training starting from a mono-phoneme acoustic model to obtain an acoustic model according to the feature sequence and the phoneme corresponding to digits in the training data;

acquiring a language model, and constructing a speech decoding network by the language model and the acoustic model obtained by training.

Acoustic feature extraction is performed on each speech segment in the training data, to perform progressive training starting from a mono-phoneme acoustic model according to a feature sequence corresponding to each speech segment and phonemes corresponding to digits in the training data, so as to obtain the acoustic model, and then the speech decoding network is constructed with the obtained language model. That is to say, the acoustic model in the speech decoding network is obtained by using the progressive training manner, that is, the mono-phoneme acoustic model is adopted as a training base, and then a second training is performed to obtain the acoustic model, thereby accelerating a convergence speed of the acoustic model training and effectively increasing the recognition accuracy of digital speech.

DESCRIPTION OF EMBODIMENTS

Typical embodiments representing features and advantages of the present disclosure will be described in detail in the following description. It should be understood that the present disclosure is provided with various changes in various embodiments, without departing from the scope of the present disclosure, and descriptions and illustrations therein are substantially illustrative only and not used for limiting the present disclosure.

As mentioned above, digital speech recognition can be realized by two types of methods: one type is an isolated word recognition technology; the other type is a universal continuous speech recognition technology.

Figure 1:
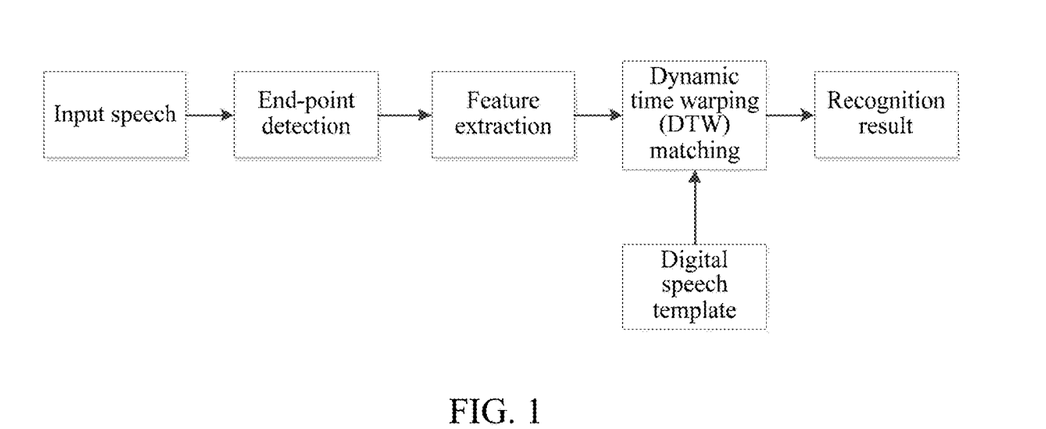
FIG. 1 is a method flowchart of an isolated recognition technology.

On one hand, as shown in FIG. 1, in the speech recognition method constructed based on the isolated word recognition technology, a starting position of an input digital speech is first determined through endpoint detection, the digital speech with starting position determined is segmented into a plurality of valid speech segments, and then feature extraction is performed on each speech segment. Finally, a dynamic time warping (DTW) algorithm is adopted to match the speech similarity between extracted features and a preset digital speech template. The digit corresponding to the most similar digital speech template is the recognition result of the digital speech. In the digital speech recognition based on the isolated word recognition technology, it is required that a clear interval exists among the digits when the digital speech is input. If continuous digital input is adopted, it may lead to non-recognition or incorrect recognition, which greatly reduces the recognition accuracy of the digital speech. Therefore, digital speech recognition based on the isolated word recognition technology has obvious limitations.

Figure 2:
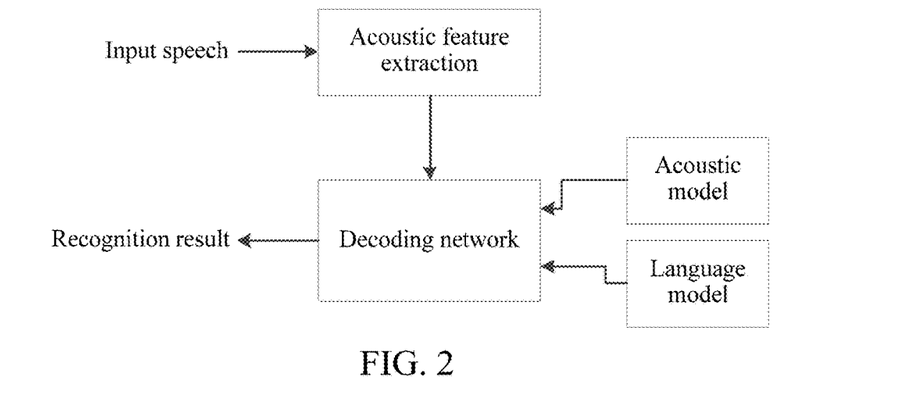
FIG. 2 is a method flowchart of a universal continuous speech recognition technology.

On the other hand, as shown in FIG. 2, in the speech recognition method based on the universal continuous speech recognition technology, an input digital speech is first subjected to acoustic feature extraction, the extracted acoustic feature is recognized by an acoustic model in a decoding network as a digital sequence, and then occurrence probability of the digital sequence is subjected to statistics by the language model in the decoding network. The digital sequence with the largest occurrence probability is a recognition result of the digital speech. However, the recognition object of this technology contains not only digits but also other language contents, which leads to the fact that the acoustic model and the language model used by the technology are too complicated, a recognition speed is relatively slow, and digits are easily to be subjected to misrecognition to be other polyphonic words, so that the recognition accuracy of digital speech is not high enough. Even if the recognition object of the language model in the technology is limited to be ten digits from 0 to 9, the improvement in recognition accuracy is still limited.

The problem that the recognition accuracy is not high exists in the above two types of speech recognition methods. In order to improve the recognition accuracy of digital speech, a method for constructing a speech decoding network in digital speech recognition is proposed. The method can rely on a computer program that will run on computer equipment with operation ability.

Figure 3:
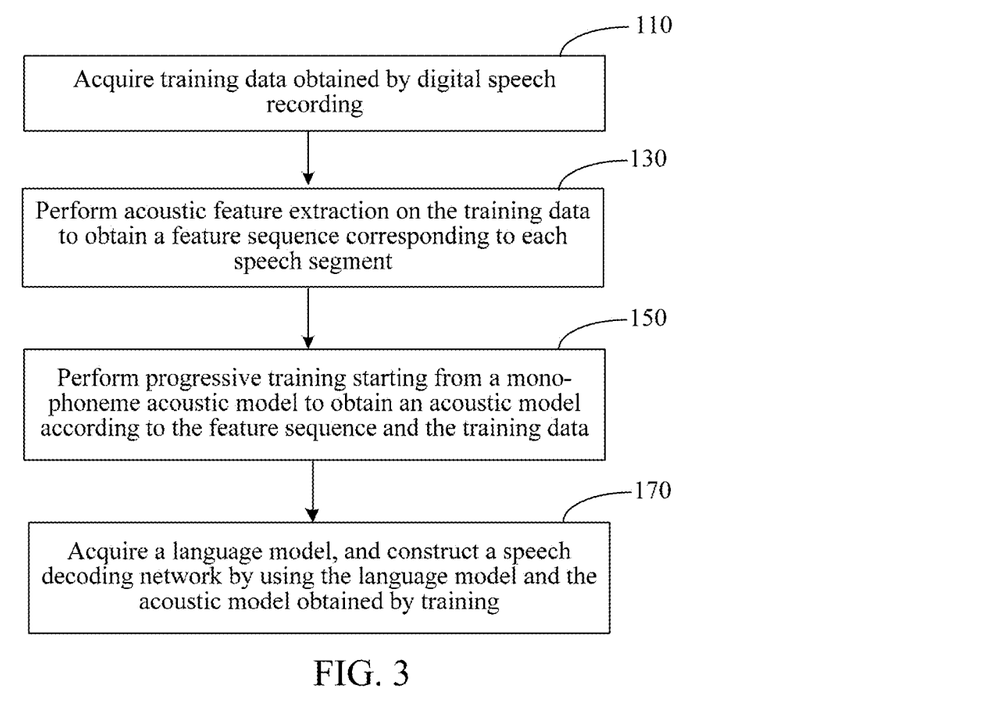
FIG. 3 is a flowchart of a method for constructing a speech decoding network in digital speech recognition provided by some embodiments of the present application.

Please referring to FIG. 3, in one embodiment, a method for constructing a speech decoding network in digital speech recognition includes the following steps:

Step 110: Acquire training data obtained by digital speech recording.

In order to construct a speech decoding network, an acoustic model and a language model need to be obtained, and the training data is the basis for training the acoustic model and the language model. The so-called acoustic model refers to one which allows the phonetic feature types of the speech to correspond to a unit such as phonemes or words. The language model then decodes the words into a complete sentence. By acquiring a large amount of training data, a relatively accurate acoustic model and language model can be obtained, so that the speech decoding network suitable for digital speech recognition may be constructed through the acoustic model and the language model, and the digital speech recognition may be relatively accurately performed.

In this embodiment, the training data includes a plurality of speech segments, and each speech segment includes speeches corresponding to a plurality of digits.

Further, a plurality of speech segments included in the training data is recorded by a plurality of persons, and a plurality of speech segments recorded by a plurality of persons will correspond to a same person, to ensure that the same person has speech segments with different frequencies, different contents, and different channels during a model training process.

Further preferably, each speech segment in the training data includes only digits and noises, and the digits existing in the training data can form a set of ten digits from 0 to 9.

The speech segment containing digits and noise is prepared as the training data used for the speech decoding network in digital speech recognition. The constructed speech decoding network is enabled to be capable of resisting the interference of non-valid speech such as noise, and the interference of noise is avoided to the maximum degree in the digital speech recognition process. It is not only suitable for digital speech recognition in quiet environment, but also has a good recognition effect for a low signal-to-noise ratio speech, and can improve the recognition and anti-noise ability in outdoor environment.

Each speech segment is obtained by recording digital speeches, which can be recorded in real time during the model training process according to the requirements of actual application scenes or be prerecorded before the model training process.

Step 130: Perform acoustic feature extraction on the training data to obtain a feature sequence corresponding to each speech segment.

Since the acoustic model is obtained by modeling and training the acoustic feature distribution of the speech, the acoustic features need to be extracted from the training data before modeling and training the acoustic model.

Further, since the training data includes a plurality of speech segments, the extraction of the acoustic features will be respectively performed on each speech segment in the training data, so as to obtain a feature sequence corresponding each speech segment.

The extracted acoustic features include Mel frequency cepstrum coefficient (MFCC) features and PITCH features, so as to be suitable for digital speech recognition.

Step 150: Perform progressive training starting from a mono-phoneme acoustic model to obtain an acoustic model according to the feature sequences and phonemes corresponding to digits in the training data.

According to the characteristics of Chinese pronunciation of digits, the initials and vowels of digits are defined as phonemes. According to the context of phonemes, phonemes can be subdivided into mono-phonemes, di-phonemes, and tri-phonemes, wherein, mono-phonemes themselves are only considered in use, without considering the context before and after the phoneme. The context of the front phoneme or the back phoneme is only considered in the use of di-phonemes. The contexts of the front phoneme and the back phoneme are simultaneously considered in the use of tri-phonemes.

Based on this, the phonemes as modeling units can be mono-phonemes, di-phonemes, or tri-phonemes. Correspondingly, a mono-phoneme acoustic model is obtained by constructing with mono-phonemes as modeling units, a di-phoneme acoustic model is obtained by constructing with di-phonemes as modeling units, and a tri-phoneme acoustic model is obtained by constructing with tri-phonemes as modeling units.

After obtaining the corresponding feature sequence of each speech segment, the input of model training is obtained. That is to say, the acoustic model that reflects the acoustic feature distribution of speech can be obtained by performing acoustic modeling and training on the feature sequence corresponding to each speech segment by using the phonemes corresponding to the digits in the training data as a modeling unit.

Progressive training is a progressive process during which multiple acoustic modeling and training are performed on the feature sequence corresponding to each speech segment. In brief, the process of progressive training is to perform training starting from an initial model, to obtain a relatively accurate intermediate model, which is subjected to training, to obtain a more accurate final model. In this embodiment, the acoustic model is obtained by performing progressive training on the basis of the mono-phone acoustic model, so that the acoustic model obtained by the progressive training is relatively accurate, thereby being beneficial to improvement of the recognition accuracy of digital speech.

It is worth mentioning that since the phonemes as modeling units can be various, the starting of progressive training is not only limited to a mono-phoneme acoustic model.

Step 170: Acquire a language model, and construct a speech decoding network by using the language model and the acoustic model obtained by training.

The language model is obtained by modeling and training the probability distribution of a language itself. In some embodiments, the occurrence of the digits in the speech usually follows certain rules. For example, the digits corresponding to the phone numbers in speech dialing are arranged according to a certain rule, or the digits corresponding to the random codes in live voice print verification are also sampled and extracted from a predefined list.

Therefore, the probability distribution of a language itself will be reflected by the matching relation of digits in the training data, when facing digital speech recognition. In this embodiment, the language model is obtained by modeling matching relations of the digits in the training data, for example, a matching relation between the digits in the training data and the phone number arrangement rules, or, a matching relation between the digits in the training data and a predefined list of random codes. It can be understood that the closer the matching relation is, the greater the occurrence probability of the digits in the training data is. Further, the language model can be obtained by modeling and training phone number arrangement rules, or, the predefined list of random codes.

After acquiring the acoustic model and the language model, the speech decoding network for realizing digital speech recognition is constructed. Since the acoustic model in the formed speech decoding network is obtained by progressive training starting from the mono-phoneme acoustic model, continuous digital speech recognition is capable of being adapted to, thus effectively improving the recognition accuracy of digital speech.

In an embodiment, before step 110, the above method further includes the following steps:

Record speech segments containing a plurality of digits to obtain training data according to preset conditions.

It can be understood that even if a same person records the speech segments containing same digits, there may be a difference. Based on this, in this embodiment, the recording of the speech segment containing a plurality of digits according to the preset conditions will facilitate improvement of the recognition accuracy of digital speech.

The preset conditions include recording via multiple apparatuses, or recording by multiple people, to simulate the same person's recording conditions in different situations. In other words, a plurality of speech segments recorded according to different preset conditions (for example, multiple apparatuses or multiple persons) correspond to a same person during the model training process, so as to ensure that the same person has speech segments with different frequencies, different contents, and different channels during the model training process, to further ensure the accuracy of subsequent use of training data for model training.

Concretely, the various apparatuses for recording may be microphone-carrying apparatuses such as smart phones, computers, and tablet computers. Since the inherent frequency bands of microphones carried by various apparatuses may be different, the recording via a variety of apparatuses will make each speech segment in the training data have different channels.

Because each person's speech speed and intonation are different respectively, for example, young women's speech speed is faster, older men's speech speed is slow, so that speech segments are recorded by multiple people, to make each speech segment in the training data to have various frequencies.

Further, the preset conditions may further include recording through various environments. For example, the environment may be a quiet classroom or a noisy street, from which training data marked with noise will be acquired, to improve the recognition accuracy of digital speech with low signal-to-noise ratio and improve the ability of anti-noise in digital speech recognition.

Figure 4:
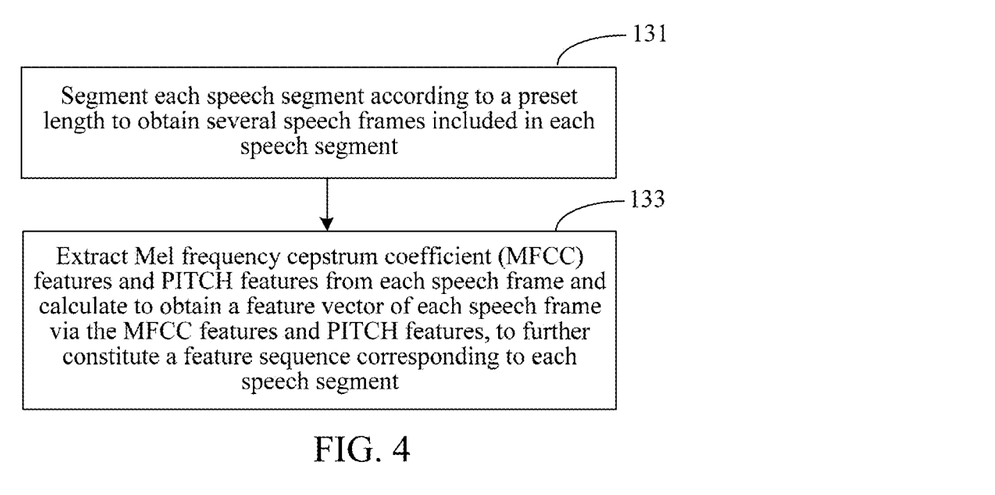
FIG. 4 is a method flowchart for performing acoustic feature extraction on training data in FIG. 3 in some embodiments of the present application.

Please referring to FIG. 4, in an embodiment, step 130 includes the following steps:

Step 131: Segment each speech segment according to a preset length to obtain a plurality of speech frames included in each speech segment.

As the length of each speech segment may be different, it will be inconvenient to extract acoustic features. Therefore, before performing acoustic feature extraction on the training data, each speech segment needs to be segmented into speech frames of the same length first.

In this embodiment, the preset length is 25 ms, and each speech segment is segmented into a plurality of speech frames of 25 ms. Further, in a preferred embodiment, an overlap exists between two adjacent speech frames. For example, an overlap of 10 ms exists between two speech frames of 25 ms, so as to improve the reliability of segmentation of speech segments according to a preset length.

Step 133: Extract Mel frequency cepstrum coefficient (MFCC) features and PITCH features from each of a plurality of speech frames included in the speech segment, and calculate to obtain a feature vector of each speech frame via the MFCC features and PITCH features, to further constitute a feature sequence corresponding to each speech segment.

It can be understood that a speech frame exists in the form of a waveform. The waveform has almost no description ability in a time domain, and therefore, the waveform must be converted.

In this embodiment, after each speech frame is obtained in the speech segment, MFCC feature and PITCH feature extraction and calculation are performed on the speech frame, and the waveform corresponding to each speech frame is converted into a multi-dimensional vector, that is, the feature vector of each speech frame is obtained, and then the digits contained in the speech segment are described by a feature sequence constituted by the feature vectors.

The process for obtaining the feature vector of the speech frame is concretely as follows:

1) Extract the MFCC feature and PITCH feature on the $t^{th}$ speech frame in the $i^{th}$ speech segment to obtain $O_i^t$;

2) Calculate the mean value of the MFCC feature and the PITCH feature corresponding to all T speech frames contained in the $i^{th}$ speech segment as a unit:

$$\overline{\mu}_i = \frac{1}{T}\sum_{t=1}^{T} O_i^t;$$

3) Calculate the difference between the MFCC feature and the PITCH feature corresponding to the $t^{th}$ speech frame and the mean value in 2): $\overline{O}_i^t = O_i^t - \overline{\mu}_i$, to improve the reliability of acoustic feature extraction by introducing the difference as an additional feature;

4) Splice the MFCC features and the PITCH features corresponding to the $t^{th}$ speech frame with the MFCC features and the PITCH features corresponding to multiple adjacent speech frames before and after the $t^{th}$ speech frame, to further improve the reliability of acoustic feature extraction, taking 4 as an example, to obtain high-dimensional features formed by splicing: $\overline{o}_i^{t'} = [\overline{o}_i^{t-4}, \overline{o}_i^{t-3}, \overline{o}_i^{t-2}, \overline{o}_i^{t-1}, \overline{o}_i^{t}, \overline{o}_i^{t+1}, \overline{o}_i^{t+2}, \overline{o}_i^{t+3}, \overline{o}_i^{t+4}]$  $\overline{O}_i^{t'} = [\overline{O}_i^{t-4}, \overline{O}_i^{t-3}, \overline{O}_i^{t-2}, \overline{O}_i^{t-1}, \overline{O}_i^{t}, \overline{O}_i^{t+1}, \overline{O}_i^{t+2}, \overline{O}_i^{t+3}, \overline{O}_i^{t+4}]$;

5) Reduce the dimensionality of the high-dimensional features by using linear discriminant analysis (LDA), so as to decrease the computational complexity while ensuring the reliability of extraction, to obtain dimensionally-reduced features: $\overline{o}_i^{t''} = \text{LDA}(\overline{o}_i^{t'})$  $\overline{O}_i^{t''} = \text{LDA}(\overline{O}_i^{t'})$;

6) Perform maximum linear likelihood transformation (MLLT) on the dimensionally-reduced features, to remove the correlation between the features, so as to finally obtain a feature vector of the $t^{th}$ speech frame: $\overline{O}_i^{t'''} = \text{MLLT}(\overline{O}_i^{t''})$;

7) Combine the feature vectors of each speech frame to obtain the feature sequence corresponding to each speech segment in the training data.

Figure 5:
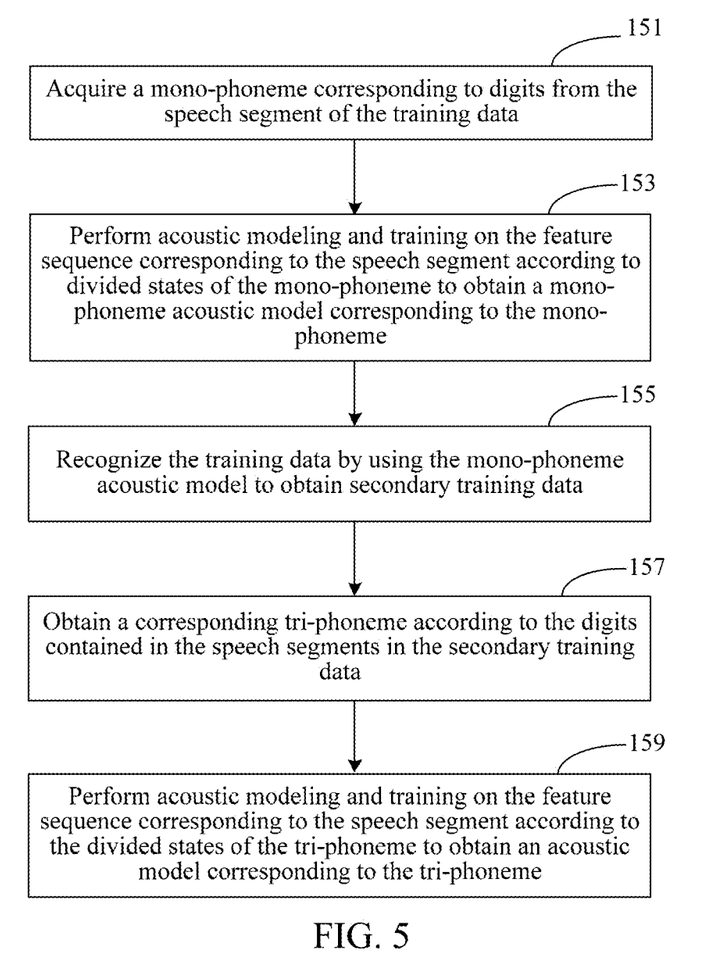
FIG. 5 is a method flowchart for obtaining an acoustic model by performing progressive training starting from a mono-phoneme acoustic model in FIG. 3 in some embodiments of the present application.

Please referring to FIG. 5, in an embodiment, step 150 includes the following steps:

Step 151: Acquire a mono-phoneme corresponding to digits from the speech segments of the training data.

As mentioned above, mono-phonemes themselves are only considered in use, without considering the context before and after the phonemes. For example, the mono-phoneme corresponding to digit 1 includes Y (initial) and I (vowel).

Concretely, in the training data, a set of mono-phoneme is constructed from multiple digits existing in each speech segment, so that a mono-phoneme corresponding to a digit may be obtained via the set of mono-phoneme. For example, a speech segment of the training data contains digit 1 and digit 3, and then the set of mono-phoneme constructed by digit 1 and digit 3 is {Y, I, S, AN}.

Step 153: Perform acoustic modeling and training on the feature sequence corresponding to the speech segment according to the divided states of the mono-phoneme, to obtain a mono-phoneme acoustic model corresponding to the mono-phoneme.

A state is a phonetic unit more basic than a phoneme. In a digital speech recognition process, several states constitute a phoneme, and several phonemes constitute a digit. Accordingly, the acquiring process of the acoustical model makes each digit correspond to a different state.

Further, as mentioned above, the speech segments containing the multiple digits in the training data are first segmented to form several speech frames, and the acoustic feature is extracted to obtain the feature sequence corresponding to the speech segment. Based on this, acoustic modeling is to establish the corresponding relationship between states and feature sequences. Model training is to optimize the established corresponding relationship, so that during the digital speech recognition process, the feature sequence extracted from input digital speech corresponds to various states, according to the optimal corresponding relationship between the states and the feature sequences. The states are combined into phonemes, which are combined into digits, to obtain the recognition results of digital speech.

In this embodiment, the feature sequence corresponding to the speech segment is acoustically modeled and trained according to divided states of the mono-phoneme. The corresponding relationship between the state and the feature sequence is established through acoustic modeling, and then the established corresponding relationship is optimized via model training. In other words, the state corresponding to the feature sequence corresponding to the speech segment can be known by using the mono-phoneme acoustic model corresponding to the mono-phoneme.

Step 155: Recognize the training data by using the mono-phoneme acoustic model to obtain secondary training data.

Because the state corresponding to the feature sequence corresponding to the speech segment can be known by using the mono-phoneme acoustic model, thus, the training data are recognized by using the mono-phoneme acoustic model, to allow the feature sequence corresponding to the speech segment in the training data to be recognized as a corresponding optimal state sequence.

Further, a corresponding set of mono-phoneme is obtained by using the optimal state sequence, so that the optimal state sequence is converted into a corresponding digital sequence being second training data.

It can be understood that the secondary training data are recognition results obtained after decoding by the speech decoding network without a language model for one time. The specific time position of each digit in the speech segment will be known via the secondary training data, to facilitate providing a good foundation for subsequent model training, thus facilitating acceleration of a convergence speed of model training.

Step 157: Obtain a corresponding tri-phoneme according to the digits contained in the speech segments in the secondary training data.

In this embodiment, tri-phonemes are acquired based on a set of tri-phoneme constructed by digits contained in the speech segments in the secondary training data. For example, one speech segment of the training data contains digits 1 and 3, and then the set of tri-phoneme constructed by digits 1 and 3 is {SIL+Y–I, Y+I–S, I+S–AN, S+AN–SIL}. SIL represents silence, indicating that no other digits exist in front of the digit 1. Y represents initial of digit 1, I represents vowel of digit 1, "+" represents connection of a front phoneme, and "–" represents connection of a rear phoneme. It can be seen that a set of tri-phoneme is constructed based on the mono-phoneme set by considering the context relationship.

Step 159: Perform acoustic modeling and training on the feature sequence corresponding to the speech segment according to the divided states of the tri-phoneme to obtain an acoustic model corresponding to the tri-phoneme.

As mentioned above, a recognition result can be obtained by only knowing the actual state which the digit corresponds.

Based on this, in this embodiment, the feature sequence corresponding to the speech segment will be subjected to acoustic modeling and training according to the divided states of the tri-phoneme. The corresponding relationship between the state and the feature sequence will be established through acoustic modeling, and then the established corresponding relationship is optimized via model training. In other words, the state corresponding to each speech frame can be known by using the acoustic model corresponding to the tri-phoneme.

Through the method as described above, the acoustic model corresponding to the tri-phonemes is trained progressively on the basis of the mono-phoneme acoustic model, which is favorable for improving the recognition accuracy of digital speech. In addition, since the context relationship is considered in the use of the tri-phonemes, to allow the acoustic model corresponding to the tri-phonemes to perform digital speech recognition more accurately, compared with the mono-phoneme acoustic model.

Figure 6:
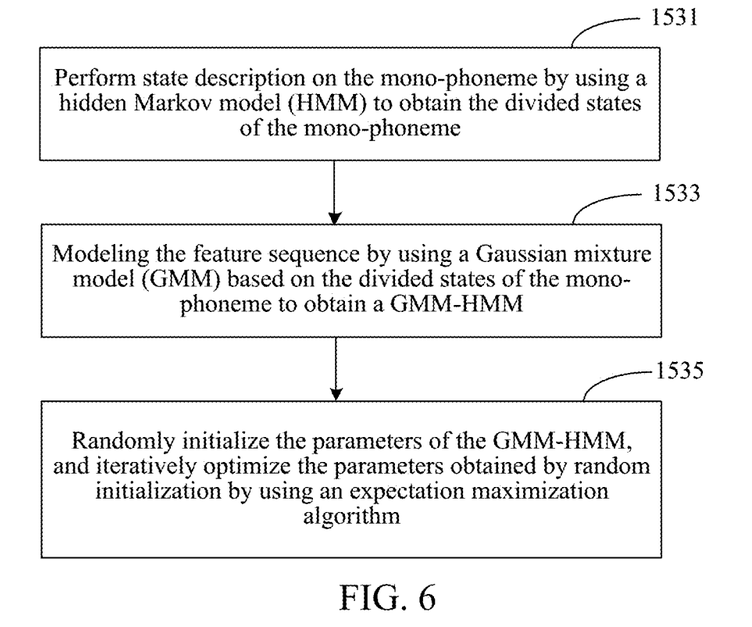
FIG. 6 is a method flowchart for performing acoustic modeling and training on a feature sequence corresponding to a speech segment according to the divided states of the mono-phoneme in FIG. 5 in some embodiments of the present application.

Please referring to FIG. 6, in an embodiment, step 153 includes the following steps:

Step 1531: Perform state description on the mono-phoneme by using an HMM to obtain the divided states of the mono-phoneme.

Figure 7:
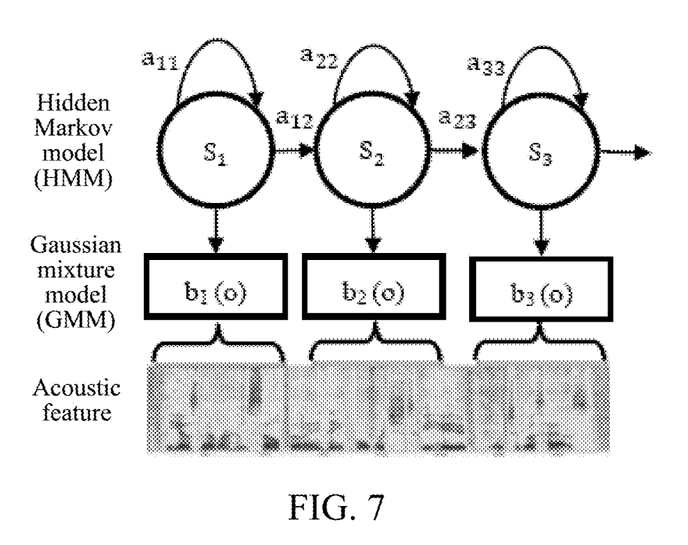
FIG. 7 is a schematic diagram of establishing a GMM-HMM for a mono-phoneme according to some embodiments of the present application.

In this embodiment, a hidden Markov model (HMM) uses a 3-state topological structure with self-loop and no-span. Briefly, state description of the mono-phoneme is performed by the HMM. Each mono-phoneme is divided into three states, as shown in FIG. 7. Each state $S_i$, i=1, 2, 3 can only jump to itself and an adjacent next state $S_{i+1}$, and $a_{ij}$ represents the transition probability of jumping from state $S_i$ to state $S_j$.

Step 1533: Model the feature sequence by using a GMM based on the divided states of the mono-phoneme.

Pleasing referring to FIG. 7 continuously, after obtaining three divided states of the mono-phoneme, for each state, the feature sequence will be modeled according to the following formula (1) by using a GMM to obtain a GMM-HMM that reflects the acoustic feature distribution of speech:

$$b_{S_i}(o) = \sum_{m=1}^{M} \frac{\lambda_m}{2\pi^{\frac{D}{2}} |\varepsilon_m|^{\frac{1}{2}}} \exp\left[-\frac{1}{2}(o - \mu_m)^T \varepsilon_M^{-1}(o - \mu_m)\right] \quad (1)$$

Wherein, $b_{S_i}(o)$ represents the probability that the feature sequence belongs to the state $S_i$, o represents the feature sequence, D represents the dimension of the feature sequence o, M represents the digit of Gaussian Mixture, $\lambda_m$ represents the weight of the $m^{th}$ Gaussian Mixture, $\varepsilon_m$ represents covariance, and $\mu_m$ represents mean vector.

Step 1535: Randomly initialize the parameters of the GMM-HMM, and perform iterative optimization on the parameters obtained by random initialization by using an expectation maximization algorithm.

Known from formula (1), the probability that the feature sequence belongs to a corresponding state can be known if $b_{S_i}(o)$ is known. It can be understood that the probability that the feature sequence belongs to a certain state is the largest, which means that the speech frame corresponding to it belongs to this state.

Therefore, in order to know $b_{S_i}(o)$, it is necessary to acquire the determined value of the unknown parameters in formula (1) via model training, i.e. the determined value of the parameters of the GMM-HMM, wherein, the parameters of the GMM-HMM include weight of Gaussian mixture $\lambda_m$, covariance $\varepsilon_m$, mean vector $\mu_m$ and transition probability $a_{ij}$.

Further, in this embodiment, the parameters of the GMM-HMM are iteratively optimized by an expectation maximization algorithm (EM Algorithm) to obtain the determined value of the parameters of the GMM-HMM. At the same time, the parameters of the GMM-HMM are randomly initialized in the initial stage of parameter iterative optimization, so that the randomly initialized parameters serve as the initial current training parameters of model training.

Specifically, each iterative optimization process of the EM algorithm includes the following two steps:

E step: Calculate the probability distribution of unknown parameters based on the current training parameters.

M step: Calculate corresponding parameters that can maximize the probability distribution expectation of the unknown parameters, the parameters being optimized parameters.

The current training parameters are updated with the optimized parameters, to continue the iterative optimization process when the optimized parameters can not allow the GMM-HMM to be converged.

It is determined that the GMM-HMM is a mono-phoneme acoustic model when the optimized parameters allow the GMM-HMM to be converged.

Please referring to FIG. 7 continuously, after the mono-phoneme acoustic model is obtained, the mono-phoneme acoustic model can reflect the distribution of the acoustic features of the input digital speech, so that the speech frame can acquire corresponding states, and then the states are combined into phonemes, which are combined into digits.

Figure 8:
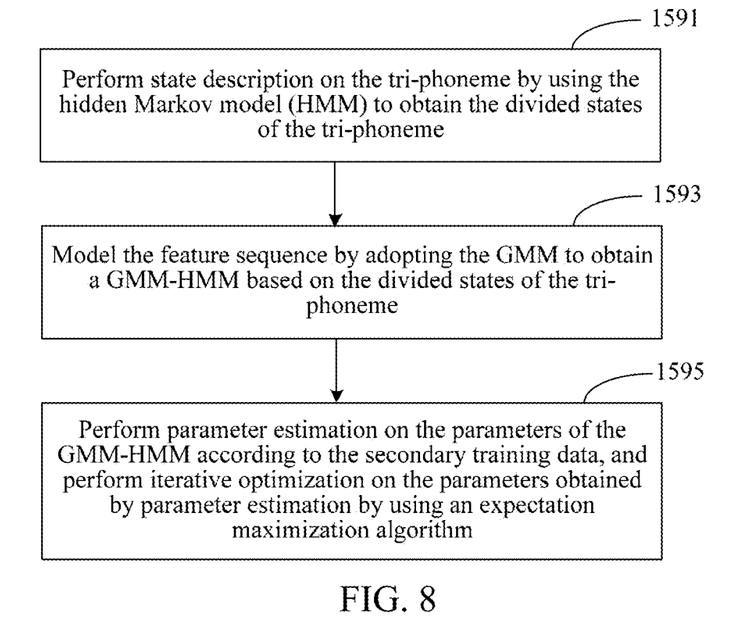
FIG. 8 is a method flowchart for performing acoustic modeling and training on a feature sequence corresponding to a speech segment according to the divided states of a tri-phoneme in FIG. 5 in some embodiments of the present application.

Please referring to FIG. 8, in an embodiment, step 159 includes the following steps:

Step 1591: Perform state description on the tri-phoneme by using the HMM to obtain the divided states of the tri-phoneme.

Step 1593: Model the feature sequence by using the GMM to obtain a GMM-HMM based on the divided states of the tri-phoneme.

Step 1595: Perform parameter estimation on the parameters of the GMM-HMM according to the secondary training data, and perform iterative optimization on the parameters obtained by parameter estimation by using the expectation maximization algorithm.

It is determined that the GMM-HMM is an acoustic model when the optimized parameters allow the GMM-HMM to be converged.

The process of constructing the above acoustic model is similar to the previous process of constructing the mono-phoneme acoustic model, and details are not described herein again.

The difference between the two lies in that the acoustic model does not randomly initialize the unknown parameters in the initial stage of parameter iterative optimization. Instead, the unknown parameters are subjected to parameter estimation based on the secondary training data, and the parameters obtained by parameter estimation serve as initial current training parameters for model training.

Specifically, since the secondary training data is the digital sequences formed by conversion of the optimal state sequences, maximum likelihood estimation (MLE) is performed on the unknown parameter according to the known digital sequences, and the corresponding determination values of the unknown parameters can be obtained.

In the initial stage of parameter iterative optimization, the parameters obtained by parameter estimation serve as current training parameters, to calculate the probability distribution of unknown parameters. The expectation maximization solving is performed on the probability distribution of the unknown parameters, until the GMM-HMM is converged, i.e., the acoustic model corresponding to the tri-phonemes are obtained.

By the method as described above, the convergence speed of the model training is effectively improved, thereby increasing the recognition accuracy of digital speech, wherein the recognition accuracy is improved by at least 10%.

Figure 9:
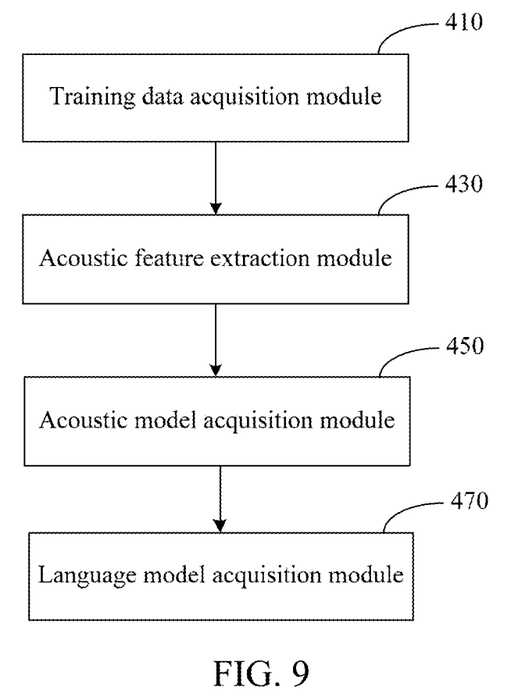
FIG. 9 is a structural block diagram of an apparatus for constructing a speech decoding network in digital speech recognition according to some embodiments of the present application.

Please referring to FIG. 9, in an embodiment, an apparatus for constructing a speech decoding network in digital speech recognition includes:

A training data acquisition module 410, configured to acquire training data obtained by digital speech recording, the training data including a plurality of speech segments.

An acoustic feature extraction module 430, configured to perform acoustic feature extraction in the training data to obtain a feature sequence corresponding to each speech segment.

An acoustic model acquisition module 450, configured to perform progressive training starting from a mono-phoneme acoustic model to obtain an acoustic model according to the feature sequence and digits in the training data.

A language model acquisition module 470, configured to obtain a language model, and construct a speech decoding network by using the language model and the acoustic model obtained by training.

In an embodiment, the apparatus as described above further includes:

A training data recording module, configured to record the speech segments containing a plurality of digits according to preset conditions to obtain training data, the plurality of speech segments in the training data corresponding to a same person.

Figure 10:
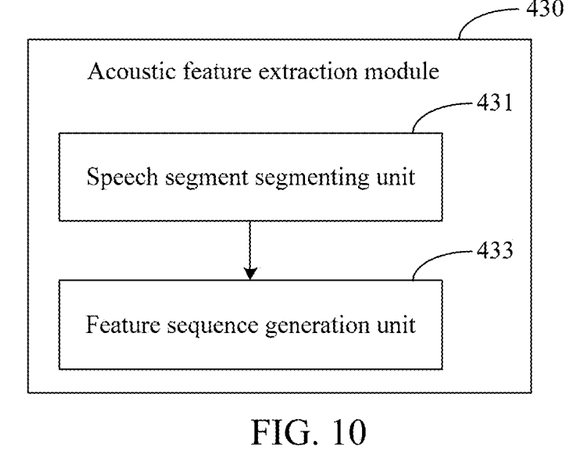
FIG. 10 is a structural block diagram of the acoustic feature extraction module in FIG. 9 in some embodiments of the present application.

Please referring to FIG. 10, in an embodiment, the acoustic feature extraction module 430 includes:

A speech segment segmenting unit 431, configured to segment each speech segment according to a preset length to obtain several speech frames included in each speech segment.

A feature sequence generation unit 433, configured to extract MFCC features and PITCH features for each of a plurality of speech frames included in the speech segment, and calculate to obtain a feature vector of each speech frame via the MFCC features and PITCH features, to further constitute a feature sequence corresponding to each speech segment.

Figure 11:
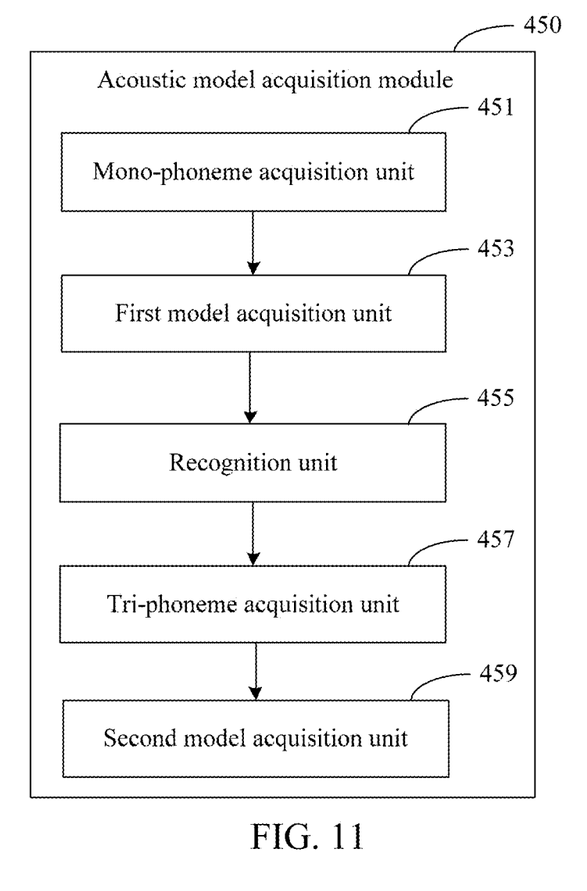
FIG. 11 is a structural block diagram of the acoustic model acquisition module in FIG. 9 in some embodiments of the present application.

Please referring to FIG. 11, in an embodiment, the acoustic model acquisition module 450 includes:

A mono-phoneme acquisition unit 451, configured to acquire a mono-phoneme corresponding to digits from speech segments of the training data.

A first model acquisition unit 453, configured to perform acoustic modeling and training on the feature sequence corresponding to the speech segment according to the divided states of the mono-phoneme to obtain a mono-phoneme acoustic model corresponding to the mono-phoneme.

A recognition unit 455, configured to recognize the training data by using the mono-phoneme acoustic model to obtain secondary training data.

A tri-phoneme acquisition unit 457, configured to obtain a corresponding tri-phoneme according to the digits contained in the speech segment in the secondary training data.

A second model acquisition unit 459, configured to perform acoustic modeling and training on the feature sequence corresponding to the speech segment according to the divided states of the tri-phoneme to obtain an acoustic model corresponding to the tri-phoneme.

Figure 12:
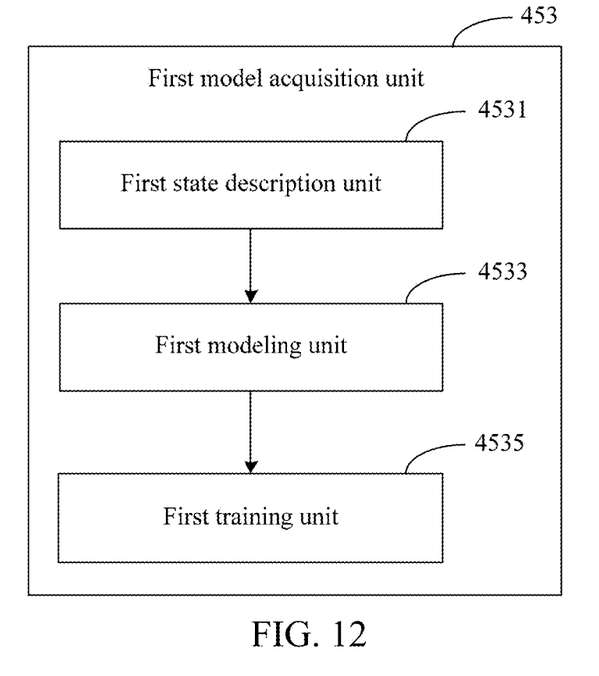
FIG. 12 is a structural block diagram of the first model acquisition unit in FIG. 11 in some embodiments of the present application.

Please referring to FIG. 12, in an embodiment, the first model acquisition unit 453 includes:

A first state description unit 4531, configured to perform state description on the mono-phoneme by using the HMM to obtain the divided states of the mono-phoneme.

A first modeling unit 4533, configured to model the feature sequence by using a GMM based on the divided states of the mono-phoneme to obtain a GMM-HMM.

A first training unit 4535, configured to randomly initialize the parameters of the GMM-HMM and perform iterative optimization on the parameters obtained by random initialization by using an expectation maximization algorithm.

It is determined that the GMM-HMM is a mono-phoneme acoustic model when the optimized parameters allow the GMM-HMM to be converged.

Figure 13:
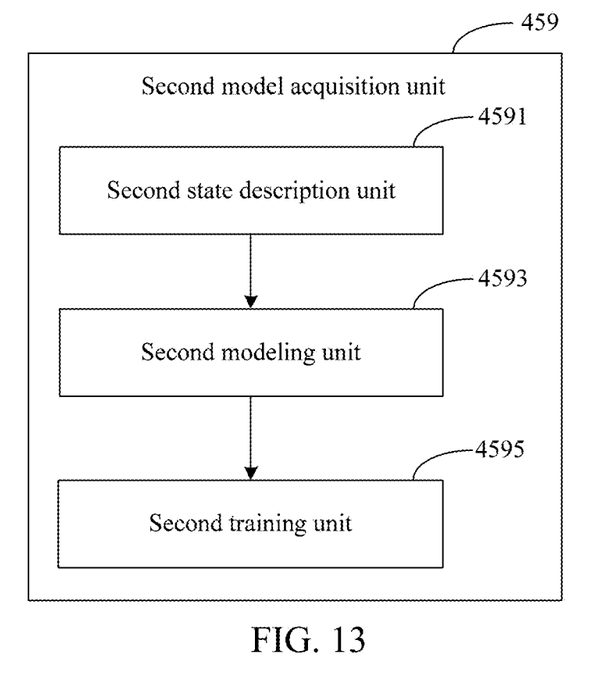
FIG. 13 is a structural block diagram of the second model acquisition unit in FIG. 11 in some embodiments of the present application.

Please referring to FIG. 13, in an embodiment, the second model acquisition unit 459 includes:

A second state description unit 4591, configured to perform state description on the tri-phoneme by using the HMM to obtain the divided state of the tri-phoneme.

A second modeling unit 4593, configured to model the feature sequence by using the GMM to obtain a GMM-HMM based on the divided states of the tri-phoneme.

A second training unit 4595, configured to perform parameter estimation on the parameters of the GMM-HMM according to the secondary training data, and perform iterative optimization on the parameters obtained by parameter estimation by using an expectation maximization algorithm.

It is determined that the GMM-HMM is an acoustic model when the optimized parameters allow the GMM-HMM to be converged.

Figure 14:
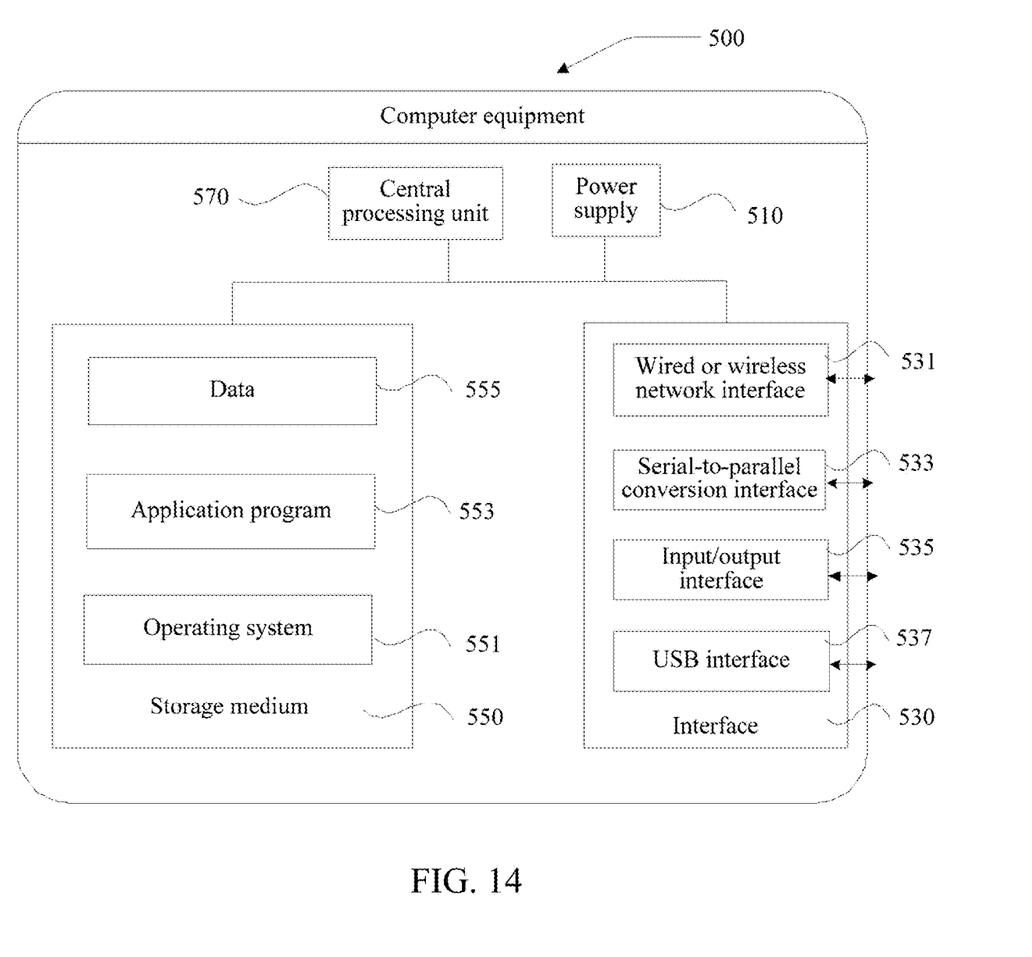
FIG. 14 is a schematic structural diagram of an apparatus for constructing a speech decoding network in digital speech recognition according to some embodiments of the present application.

Please referring to FIG. 14. FIG. 14 is a schematic structural diagram of an apparatus 500 for constructing a speech decoding network in digital speech recognition provided by an embodiment of the present invention. The steps in the above embodiments may all be based on the structures shown in the figure.

A great difference may occur in the apparatus 500 due to the difference of configuration or performance. The apparatus 500 includes a power supply 510, an interface 530, at least one storage medium 550, and at least one central processing unit (CPU) 570.

Specifically, the power source 510 is configured to provide operating voltage for each hardware apparatus on the apparatus 500.

The interface 530 includes at least one wired or wireless network interface 531, at least one serial-to-parallel conversion interface 533, at least one input/output interface 535, at least one USB interface 537, etc., for communicating with external apparatuses.

The storage medium 550, as a carrier for storing resources, may be a random access medium, a magnetic disk, an optical disk, etc. The resources stored in the storage medium 550 include an operating system 551, an application program 553, data 555, etc. A storage manner may be temporary storage or permanent storage. The operating system 551 is configured to manage and control the hardware apparatuses on the apparatus 500 and the application program 553, so that calculation and processing of the mass data 555 via the CPU 570 can be realized. The operating system 551 may be Windows Server™, Mac OS X™ Unix™, Linux™, FreeBSD™, etc. The application program 553 is a computer program that finishes at least one specific task based on the operating system 551. The application program 553 may include at least one module (not shown in figures), each of which may respectively include a series of operation instructions for the apparatus 500. Data 555 may be the training data stored in a disk, etc.

The CPU 570 may include one or more processors and is configured to communicate with the storage medium 550 via a bus, for calculating and processing the mass data 555 in the storage medium 550.

A series of operation instructions stored in the storage medium 550 are read by the CPU 570 and executed on the apparatus 500 based on the operating system 551 on the storage medium 550, to further allow that all or part of the steps in the above embodiments can be completed by running related computer programs on the apparatus.

The above descriptions are merely preferred embodiments of the present invention, and are not used to limit the present disclosure. Any modifications, equivalent replacements and improvements, etc. made within the spirit and principle of the present disclosure should be included in the protection scope of the present disclosure.

What is claimed is:

1. A method for constructing a speech decoding network for recognizing digits in speech, comprising:
   acquiring primary training data comprising a plurality of speech segments, and each speech segment comprising a plurality of digits;
   performing acoustic feature extraction on the primary training data to obtain a plurality of feature sequences from the plurality of speech segments;
   performing progressive training to obtain a tri-phoneme acoustic model based on the plurality of feature sequences and a plurality of phonemes corresponding to the digits in the speech segments in the primary training data, including:
      obtaining a mono-phoneme acoustic model by training a model with the plurality of feature sequences according to divided states of a plurality of mono-phonemes corresponding to the digits in the plurality of speech segments;
      decoding the primary training data with the mono-phoneme acoustic model to obtain secondary training data;
      obtaining the tri-phoneme acoustic model by training a model with a plurality of feature sequences in the secondary training data according to divided states of a plurality of tri-phonemes corresponding to digits in a plurality of speech segments in the secondary training data;
   acquiring a language model by modeling matching relations of the plurality of digits in the primary training data; and
   constructing a speech decoding network by using the language model and the tri-phoneme acoustic model obtained by training.

2. The method according to claim 1, including, before the step of acquiring the primary training data:
   recording speech segments containing the plurality of digits to obtain training data according to preset conditions, the plurality of speech segments in the primary training data being corresponding to a same person.

3. The method according to claim 1, wherein performing acoustic feature extraction on the primary training data to obtain the plurality of feature sequences from the plurality of speech segments comprises:
   segmenting a respective speech segment of the plurality of speech segments according to a preset length to obtain a plurality of speech frames for the respective speech segment;
   extracting Mel frequency cepstrum coefficient (MFCC) features and PITCH features from each of the plurality of speech frames included in the respective speech segment; and
   calculating to obtain a feature vector of each of the plurality of speech frames via the MFCC features and PITCH features, to further constitute a feature sequence corresponding to each speech segment.

4. The method according to claim 1, wherein training the model with the plurality of feature sequences according to the divided states of the plurality of mono-phonemes to obtain the mono-phoneme acoustic model comprises:
- performing state description on the plurality of mono-phonemes by using a hidden Markov model (HMM) to obtain the divided states of the plurality of mono-phonemes;
- modeling the plurality of feature sequences by using a Gaussian mixture model (GMM) based on the divided states of the plurality of mono-phonemes to obtain a GMM-HMM;
- randomly initializing parameters of the GMM-HMM, and performing iterative optimization on the parameters obtained by random initialization by using an expectation maximization algorithm; and
- determining that the GMM-HMM is the mono-phoneme acoustic model when the optimized parameters allow the GMM-HMM to be converged.

5. The method according to claim 1, wherein training the model with the plurality of feature sequences in the secondary training data according to the divided states of the plurality of tri-phonemes to obtain the tri-phoneme acoustic model comprises:
- performing state description on the plurality of tri-phonemes by using a hidden Markov model (HMM) to obtain the divided states of the plurality of tri-phonemes;
- modeling the plurality of feature sequences by using a Gaussian mixture model (GMM) to obtain a GMM-HMM based on the divided states of the plurality of tri-phonemes;
- performing parameter estimation on parameters of the GMM-HMM according to the secondary training data, and performing iterative optimization on the parameters obtained by parameter estimation by using an expectation maximization algorithm; and
- determining that the GMM-HMM is the tri-phoneme acoustic model when the optimized parameters allow the GMM-HMM to be converged.

6. The method according to claim 1, wherein the matching relations comprise: a matching relation between the plurality of digits in the primary training data and phone number arrangement rules, or, a matching relation between the plurality of digits in the primary training data and a predefined list of random codes.

7. An apparatus for constructing a speech decoding network for recognizing digits in speech, comprising:
- a training data acquisition module, configured to acquire primary training data comprising a plurality of speech segments, and each speech segment comprising a plurality of digits;
- an acoustic feature extraction module, configured to perform acoustic feature extraction on the primary training data to obtain a plurality of feature sequences from the plurality of speech segments;
- an acoustic model acquisition module, configured to perform progressive training to obtain a tri-phoneme acoustic model based on the plurality of feature sequences and a plurality of phonemes corresponding to the digits in the speech segments in the primary training data, including:
  - obtaining a mono-phoneme acoustic model by training a model with the plurality of feature sequences according to divided states of a plurality of mono-phonemes corresponding to the digits in the plurality of speech segments;
  - decoding the primary training data with the mono-phoneme acoustic model to obtain secondary training data;
  - obtaining the tri-phoneme acoustic model by training a model with a plurality of feature sequences in the secondary training data according to divided states of a plurality of tri-phonemes corresponding to digits in a plurality of speech segments in the secondary training data; and
- a language model acquisition module, configured to acquire a language model by modeling matching relations of the plurality of digits in the primary training data and construct a speech decoding network by using the acquired language model and the tri-phoneme acoustic model obtained by training.

8. The apparatus according to claim 7, wherein the apparatus further comprises:
- a training data recording module, configured to record speech segments containing the plurality of digits according to preset conditions to obtain training data, the plurality of speech segments in the primary training data being corresponding to a same person.

9. The apparatus according to claim 7, wherein the acoustic feature extraction module comprises:
- a speech segment segmenting unit, configured to segment a respective speech segment of the plurality of speech segments according to a preset length to obtain a plurality of speech frames for the respective speech segment;
- a feature sequence generation unit, configured to extract Mel frequency cepstrum coefficient (MFCC) features and PITCH features from each of the plurality of speech frames included in the respective speech segment; and calculating to obtain a feature vector of each of the plurality of speech frames via the MFCC features and PITCH features, to further constitute a feature sequence corresponding to each speech segment.

10. The apparatus according to claim 7, wherein the acoustic model acquisition module comprises:
- a first state description unit, configured to perform state description on the plurality of mono-phonemes by using an HMM to obtain the divided states of the plurality of mono-phonemes;
- a first modeling unit, configured to model the plurality of feature sequence by using a GMM based on the divided states of the plurality of mono-phonemes to obtain a GMM-HMM; and
- a first training unit, configured to randomly initialize parameters of the GMM-HMM and perform iterative optimization on the parameters obtained by random initialization by using an expectation maximization algorithm,
- the GMM-HMM being determined to be the mono-phoneme acoustic model when the optimized parameters allow the GMM-HMM to be converged.

11. The apparatus according to claim 7, wherein the acoustic model acquisition module further comprises:
- a second state description unit, configured to perform state description on the plurality of tri-phonemes by using a hidden Markov model (HMM) to obtain the divided states of the plurality of tri-phonemes;
- a second modeling unit, configured to model the plurality of feature sequences by using a Gaussian mixture model (GMM) to obtain a GMM-HMM based on the divided states of the plurality of tri-phonemes; and
- a second training unit, configured to perform parameter estimation on parameters of the GMM-HMM according to the secondary training data, and perform iterative optimization on the parameters obtained by parameter estimation by using an expectation maximization algorithm, the GMM-HMM being determined to be the tri-phoneme acoustic model when the optimized parameters allow the GMM-HMM to be converged.

12. The apparatus according to claim 7, wherein the language model is obtained by modeling matching relations of the plurality of digits in the primary training data, the matching relation comprising: a matching relation between the plurality of digits in the primary training data and phone number arrangement rules, or, a matching relation between the plurality of digits in the primary training data and a predefined list of random codes.

13. A non-transitory computer-readable storage medium storing machine-readable instructions that when executed by a processor, causes the processor to perform:

acquiring primary training data comprising a plurality of speech segments, and each speech segment comprising a plurality of digits;

performing acoustic feature extraction on the primary training data to obtain a plurality of feature sequences from the plurality of speech segments;

performing progressive training to obtain a tri-phoneme acoustic model based on the plurality of feature sequences and a plurality of phonemes corresponding to the digits in the speech segments in the primary training data, including:

obtaining a mono-phoneme acoustic model by training a model with the plurality of feature sequences according to divided states of a plurality of mono-phonemes corresponding to the digits in the plurality of speech segments;

decoding the primary training data with the mono-phoneme acoustic model to obtain secondary training data;

obtaining the tri-phoneme acoustic model by training a model with a plurality of feature sequences in the secondary training data according to divided states of a plurality of tri-phonemes corresponding to digits in a plurality of speech segments in the secondary training data;

acquiring a language model by modeling matching relations of the plurality of digits in the primary training data; and constructing a speech decoding network by using the language model and the tri-phoneme acoustic model obtained by training.

* * * * *